United States Patent [19]

De Feo et al.

[11] 4,011,209

[45] Mar. 8, 1977

[54] ORGANIC SOLVENT-SOLUBLE AZO DYES

[75] Inventors: Francesco De Feo; Sisto Papa, both of Milan; Enrico Traverso, Monza (Milan), all of Italy

[73] Assignee: Aziende Colori Nazionali Affini ACNA S.p.A., Milan, Italy

[22] Filed: Mar. 5, 1973

[21] Appl. No.: 337,821

Related U.S. Application Data

[63] Continuation of Ser. No. 153,868, June 16, 1971, abandoned.

[52] U.S. Cl. .............................. 260/207.5; 260/186; 260/187; 260/206; 260/207; 260/207.1; 260/208; 44/59
[51] Int. Cl.² ..................................... C09B 43/00
[58] Field of Search .............. 260/206, 207, 207.1, 260/207.5

[56] References Cited

UNITED STATES PATENTS 2,266,142  12/1941  Adams ........................ 260/207.5
3,586,663  6/1971   Kruckenberg ............. 260/207.5 X

*Primary Examiner*—Charles F. Warren

[57] ABSTRACT

Azo dyes which are highly soluble in organic solvents are disclosed. The dyes have the general formula

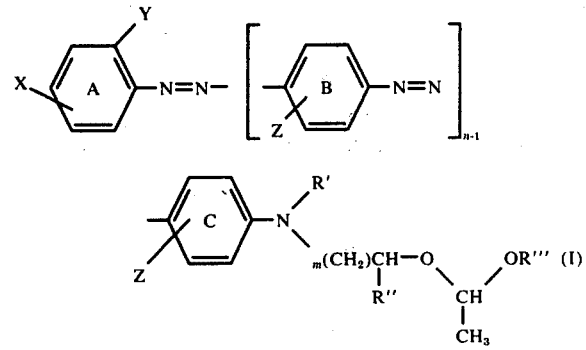

in which
$m = 1$ to 3;
$n = 1$ or 2;
$X = H$ or $NO_2$;
$Y = H$, $Cl$, $NO_2$, lower alkyl or lower alkoxy radicals containing from 1 to 3 carbon atoms;
$Z$ and $Z' = H$, $Cl$, lower alkyl or alkoxy radicals containing 1 to 3 carbon atoms, or lower acylamine groups;
$R' =$ alkyl or

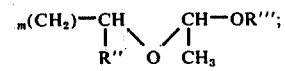

$R'' = H$, or a lower alkyl radical containing 1 to 3 carbon atoms;
$R''' =$ an alkyl radical containing from 1 to 18 carbon atoms, or a cycloalkyl radical.

The aromatic nuclei A, B, and C may have other water-insoluble substituents.

Organic solvent solutions of the azo dyes are provided, as are, also, processes for obtaining the dyes.

6 Claims, No Drawings

ORGANIC SOLVENT-SOLUBLE AZO DYES

This is a continuation, division, of application Ser. No. 153,868 filed June 16, 1971, now abandoned.

THE PRIOR ART

Heretofore, dyes compounded with organic solvents have been provided in the solid state, as powders, granules, flakes and the like. Many difficulties and problems have been encountered in the preparation and use of such products. In fact, powders of the solvent-containing dyes originate environmental dust and, in consequence, are difficult to handle. Agglomerates comprising the solvent-containing dyes have the drawback of a lower solubilization rate, which limits their usefulness.

On the other hand, when the traditional solvent-containing dyes (CF. e.g., C. I. 2nd Ed. 1956, Nos. 11020, 12055, 26100 and 26105) are used, it is not possible to employ concentrated solutions prepared in advance of use, inasmuch as the dyes are only sparingly soluble in the organic solvents, the solubility being, generally, only to the extent of 2% to 5%.

In consequence, additional expense is incurred due to the large amount of solvent needed, the requirement for special apparatus, and the increased shipping costs.

Even fluid pastes having a high dye concentration (solid dye finely divided in the support) present the inconvenience that it is not possible to obtain, rapidly, a homogeneous distribution of the dye in the material to be colored.

THE PRESENT INVENTION

A primary object of this invention was to provide liquid dye compositions which could be prepared very simply and inexpensively, and which would have excellent tinctorial power, excellent stability against crystallization at low temperatures up to 0° C, the capacity to dissolve or disperse instantly in the organic solvents, and particularly in the liquid petroleum distillates, thus making it possible to color those products during loading thereof in tank cars by means of a metering-mixing pump.

We have now found, surprisingly, that dyes of the general formula as set out and defined in the foregoing Abstract Of Disclosure are characterized by high coloring power and solubility in organic solvents, and are stable to recrystallization at low temperatures, by virtue of which characteristics said dyes can be used very advantageously for many purposes.

For instance, due to the chemical and physical characteristics thereof, the dyes of this invention are adapted to use as coloring agents for a wide variety of materials including inks, synthetic plastics, natural and synthetic resins, wood, oils, natural and synthetic waxes, and in the denaturing of organic liquids. In particular, these dyes are eminently suitable for use in coloring gasoline, gas oil, lubricating oils, and similar liquid petroleum distillates.

The various petroleum distillates are colored for the purpose of indicating both the source thereof, and the commercial and industrial applications for which they are intended.

The dyes embraced in formula (I) given in the foregoing Abstract, can be prepared for instance, —and the process for synthesizing the same is another object of this invention— by reacting, in an anhydrous organic solvent, a dye of the general formula

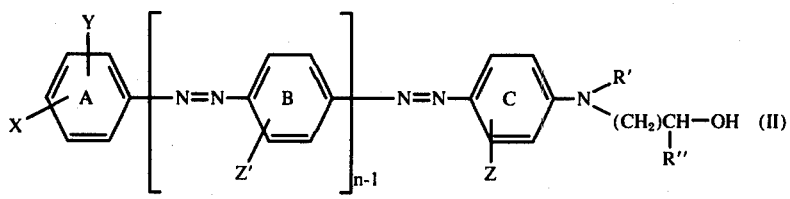

with a vinylether of the general formula $$CH_2 = CH - O - R'''$$

in which A, B, C, X, Y, Z, Z', R', R'' and R''', $m$ and $n$ have the same significance as in formula (I). The reaction is carried out in the presence of an acid catalyst, such as, for instance, $BF_3$; $(C_2H_5)_2O$; $AlCl_3CaCl_2$; $ZnCl_2$ and HCl, at a temperature of from room temperature to 100° C, and preferably at between 50° C and 70° C.

The intermediate dyes of formula II are prepared by known processes. For example, those intermediate dyes can be prepared by coupling a diazo-amino compound of the general formula

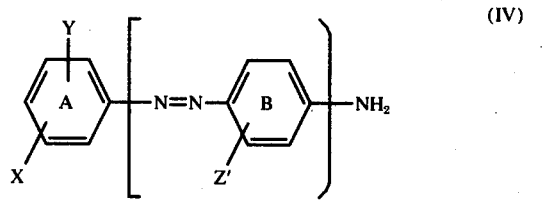

with a coupling agent of the general formula:

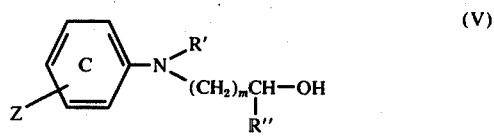

in which the substituents are as set forth hereinabove.

The anhydrous inert organic solvents useful as reaction medium include toluene, xylene and chlorobenzene.

As the acetylation reaction proceeds, the dye which is formed is dissolved in the organic solvent.

At the end of the reaction, the catalyst is neutralized by means of an anhydrous inorganic alkaline substance, such as $Na_2CO_3$; $K_2CO_3$ or the like, and/or by means of an aliphatic amine such as triethylamine, triethanolamine, etc. The neutralization is always effected under anhydrous conditions.

Under the working conditions, the dye is not extractable by aqueous alkaline solutions nor, in practice, even by aqueous acid solutions.

In fact, the quantity of dye extracted by aqueous acid solutions would be so small that the shade and intensity of the organic phase (for instance, gasoline and commercial gas oils) would not be considerably varied.

Liquid coloring compositions are obtained which can be used for coloring gasoline and gas oil.

The technical advantages of this invention are not limited to those illustrated above, which depend on the execptionally high solubility of the dyes in the organic solvents. Another advantage derives from the possibility of varying the substituents R', R'', R''', X, Y and Z in the formula, to obtain shades from yellow to violet.

More specifically, the organic solvent-soluble monoazo dyes of the invention have the formula:

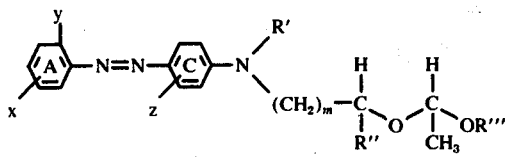

in which

A and C each represents the phenyl ring; $m$ is an integer from 1 to 3;

$x$ represents H or a $NO_2$ group;

$y$ represents H, Cl, $NO_2$, or alkyl or alkoxy containing from 1 to 3 carbon atoms;

$z$ represents H, Cl, or alkyl or alkoxy containing from 1 to 3 carbon atoms or a lower-acylamino radical;

R' represents alkyl containing from 1 to 3 carbon atoms; or R' represents the group

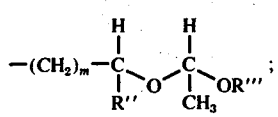

R'' represents H or alkyl containing from 1 to 3 carbon atoms; and

R''' represents alkyl containing from 1 to 18 carbon atoms.

The following examples are given to illustrate the invention and not intended to be limiting.

EXAMPLE 1

17.25 g of 2-chloro-4-nitroaniline (m.w. 172.6) were suspended in 30 ml $H_2O$ and 30 ml HCl 10 N at room temperature. The suspension was kept under stirring overnight. 100 g of ice were added and the diazotization was carried out by rapidly pouring below level a 20% aqueous $NaNO_2$ solution (0.11 mols). The solution was stirred for 2 hours at 0°–3° C. The excess $HNO_2$ was removed and the solution was clarified. The diazo solution was poured off, in 30 minutes, into the solution of 18 g N-ethyl-N-betaoxyethyl-m-toluidine (m.w. 179.25) in 11 ml HCl 10 N and 350 ml $H_2O$ at the temperature of 0°–3° C. At the end of the coupling, the whole was filtered and washed up to neutralization.

The cake was dried at 80° C. The monoazo-compound, dry and finely ground, was fed in a 250 ml reactor, into 80 ml xylene; 20 ml of vinylisobutylether (m.w. 100.16, $d^{20} = 0.77$) and 0.1 g of dietherated $BF_3$ were added thereto. In 20 minutes, the temperature rose to 55°–60° C. As the condensation proceeded, the dye passed into solution.

After about 2 hours at 60° C, the reaction was completed. (Chromatographic control on a thin layer).

The whole was cooled at room temperature and clarified by filtration. The obtained solution was fluid even at T<0° C and colored the petroleum products red.

EXAMPLE 2

The solution of 18.3 g of 2,4-dinitroaniline (m.w. 183.13) in 23 ml $H_2SO_4$ 66°Be was poured into 60.6 g of a sulphuric mass containing 0.11 mols of nitrosylsulphuric acid, at about 15° C. The solution was kept under stirring for 30 minutes, the mass was discharged into 250 g of ice, the excess $HNO_2$ was removed and the solution was clarified (volume about 350 ml). The diazo solution was poured off, in 40 minutes at 0°–3° C, into the solution of 16.5 g N-ethyl-N-betaoxyethylaniline (m.w. 165.25) in 11 ml HCl 10 N and 350 ml $H_2O$.

At the end of the coupling, the solution was filtered, the cake was washed up to the neutralization and introduced into a stove at 55° C. The dry and finely ground monoazo-compound was transferred to a 250 ml reactor and it was fed with 80 ml xylene and 20 ml vinylisobutylether (m.w. 100.16) at room temperature. Then the mass was amalgamated, 0.1 g $CaCl_2$ was added thereto and the temperature rose, in 20 minutes, to 50°–55° C. As the reaction proceeded, the dye passed into solution.

After about 2 hours at the temperature of 55° C the condensation was completed (chromatographic control on a thin layer).

The whole was cooled at room temperature and clarified by filtration. The obtained solution was fluid even at a temperature <0° C. It colored the petroleum products red.

EXAMPLE 3

15.3 g of 2-amino-5-nitrotoluene (m.w. 152.2) were suspended in 50 ml $H_2O$ and 30 ml HCl 10 N. The suspension was kept under stirring overnight. 100 g ice were added and the suspension was diazotized by rapidly pouring below level a 20% $NaNO_2$ (0.11 mols) aqueous solution. The whole was stirred for 1 hour at a temperature of 0°–3° C. The excess $HNO_2$ (volume about 250 ml) was removed and the solution was clarified. A solution of 16.5 g. N-ethyl-N-betaoxyethylaniline (m.w. 165.23) in 11 ml HCl 10 N and 400 ml $H_2O$ was poured off, in 50 minutes and at 0°–3° C, into the diazo solution buffered with 50 g of sodium acetate crystals. At the end of the coupling, the solution was filtered, washed with $H_2O$ without salts and dried at 80° C.

The dry and well ground monoazo-compound was transferred to a 250 ml reactor and it was fed with 80 ml xylene and 20 ml vinylisobutylether (m.w. 100.16) at room temperatur.

Then the mass was amalgamated, 0.1 g $ZnCl_2$ was added and the temperature, in 20 minutes, rose to 55°–60° C.

As the reaction proceeded, the dye passed into solution. After about 3 hours at a temperature of 55° C, the condensation was completed (chromatographic control on a thin layer).

The whole was cooled at room temperature and clarified by filtration. The obtained solution was fluid even at the temperature <0° C and colored the petroleum products orange.

EXAMPLE 4

9.35 g aniline (m.w. 93.12) were dissolved in 22.5 ml HCl 10 N and 125 ml H₂O. 80 g ice were added and the mass was diazotized by pouring, in about 20 minutes, at a temperature of 0°–3° C, a 20% NaNO₂ aqueous solution until a weak, persistent mark appeared on the iodide-starch test paper. Volume about 220 ml. A solution of 16.5 g N-ethyl-N-oxyethylaniline (m.w. 165.23) in 11 ml HCl 10 N and 350 ml H₂O was poured, in 50 minutes, at a temperature of 0°–3° C, into the diazo solution, buffered with 40 g of sodium acetate.

At the end of the coupling, the solution was filtered, the cake was washed with H₂O without salts and dried at 80° C. The dry and well ground monoazo-compound was transferred into a 250 ml reactor and it was fed with 80 ml xylene and 20 ml vinylisobutylether (m.w. 100.16) at room temperature.

Then the mass was amalgamated, 0.2 g of BCl₃ were added and the temperature rose, in 20 minutes, to 65°–70° C.

As the reaction proceeded, the dye passed in solution. After about 2 hours at the temperature of 55° C, the condensation was completed (chromatographic control on a thin layer).

The whole was cooled at room temperature and clarified by filtration. The obtained solution was fluid even at temperatures <0° C. It colored the petroleum products yellow.

EXAMPLE 5

17.25 g of 2-chloro-4-nitroaniline (m.w. 172.6) were suspended in 30 ml H₂O and 30 ml HCl 10 N at room temperature. The suspension was kept under stirring overnight.

100 g of ice were added and diazotization was carried out by rapidly pouring below level a 20% aqueous NaNO₂ solution (0.11 moles). The solution was stirred for 2 hours at 0°–3° C. The excess HNO₂ was removed and the solution was clarified.

The diazo solution was poured off, in 30 minutes, into the solution of 19.5 g of N-methyl-N-(2-hydroxy-1-propyl)-m-toluidine (m.w. 193.3) in 11 ml HCl ₁₀ N and 350 ml H₂O. Temperature 0°–3° C.

At the end of the coupling, the solution was filtered and washed up to neutralization. The cake was dried at 80° C.

The dry and finely ground monoazo-compound was fed in a 250 ml reactor into 80 ml xylene; 20 ml vinylisobutylether (m.w. 100.16) were added thereto, a weak stream of gaseous HCl was bubbled into the mass for 5–10 minutes and it was heated, in about 20 minutes, at 60° C.

As the condensation proceeded, the dye passed into solution. After about 2 hours at 60° C, the reaction was completed (chromatographic control on a thin layer). The whole was cooled at room temperature and clarified by filtration. The obtained solution was fluid even at 0° C and colored the petroleum products red.

EXAMPLE 6

22.5 g of para-aminoazobenzene (m.w. 197.24), having a titre of 87.8% were suspended in 150 ml of water at 60° C.

The suspension was kept under stirring overnight. Then 400 ml H₂O, 35 ml HCl 10 N and 80 g of ice were added thereto. The diazotization was carried out by pouring, below level, in 30 minutes, a 20% aqueous NaNO₂ solution (0.11 mols) at a temperature of 8° C. The solution was kept under stirring for 1 hour, then the excess HNO₂ was removed and the solution was clarified (volume about 700 ml). A solution of 16.5 g of N-ethyl-N-oxyethylaniline (m.w. 165.23) in 11 ml HCl 10 N and 100 ml H₂O was poured off, in 60 minutes, at 0°–3° C, into the diazo solution, buffered with 60 g soldium acetate.

At the end of the coupling, the solution was filtered, the cake was washed with H₂O in the absence of salts, and it was dried at 80° C. The dry and well ground monoazo-compound was introduced into a 250 ml reactor, and 80 ml xylene and 20 ml vinylisobutylether (m.w. 100.16) were fed at room temperature.

Then the mass was amalgamated, 0.2 g of AlCl₃ were added and the temperature rose, in 20 minutes, to 65° C.

As the reaction proceeded, the dye passed into solution. After about 2 hours at 65° C, the condensation was completed (chromatographic control on a thin layer).

The solution was cooled at room temperature and clarified by filtration. The obtained solution was fluid even at <0° C and it colored the petroleum products orange.

The dyes obtained in the foregoing examples 1–6, had the following structures:

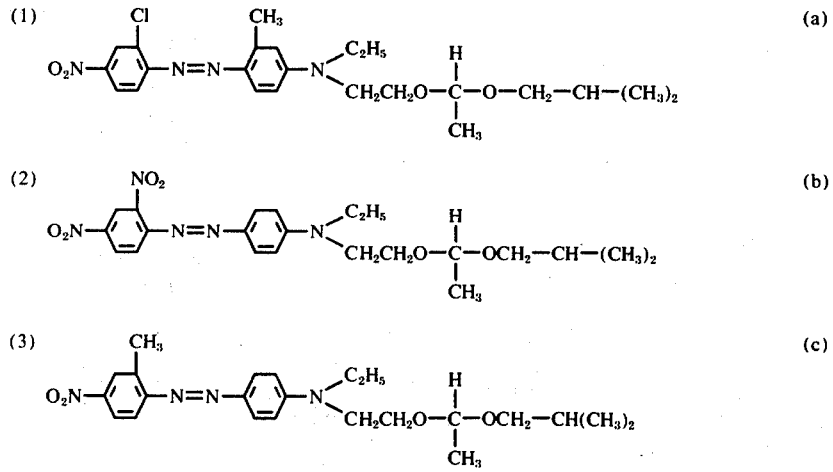

(4) 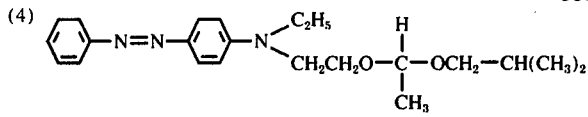

(5) 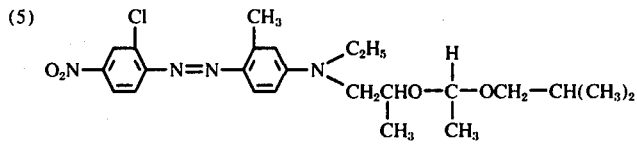

(6) 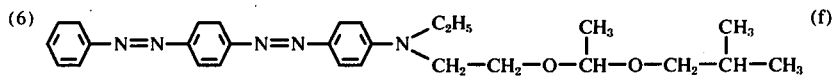

As will be apparent, changes in details may be made in practicing this invention, without departing from its spirit. The changes may be with respect to the chemical structures of the dyes in dependence on the precise substituents within those disclosed, with respect to the conditions of preparing the dyes, and with respect to the end uses of the dyes. We intend, therefore, to include in the scope of the appended claims all changes and modifications which will be obvious to those skilled in the art from the description and working examples given herein.

What we claim is:

1. An organic solvent-soluble azo dye having the formula

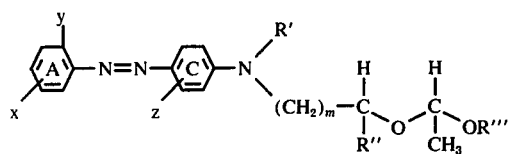

in which
A and C each represents the phenyl ring;
m is an integer from 1 to 3;
x represents H or a $NO_2$ group;
y represents H, Cl, $NO_2$ or alkyl or alkoxy containing from 1 to 3 carbon atoms;
R' represents alkyl containing from 1 to 3 carbon atoms; or R' represents the group
z represents H, Cl, or alkyl or alkoxy containing from 1 to 3 carbon atoms;

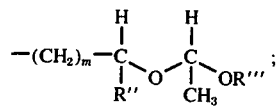

R'' represents H or alkyl containing from 1 to 3 carbon atoms; and
R''' represents alkyl containing from 1 to 18 carbon atoms.

2. An organic solvent-soluble azo dye having the formula

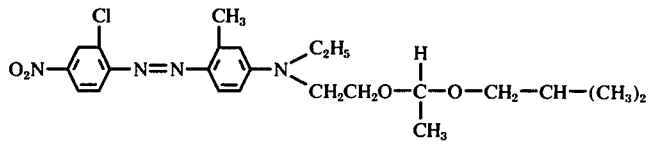

3. An organic solvent-soluble azo dye having the formula

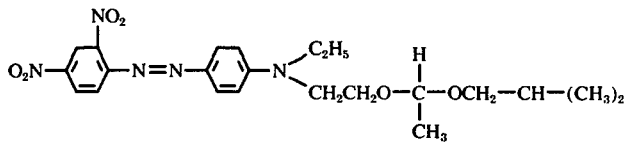

4. An organic solvent-soluble azo dye having the formula

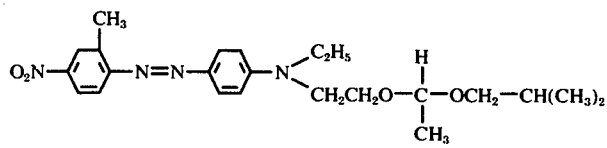

5. An organic solvent-soluble azo dye having the formula

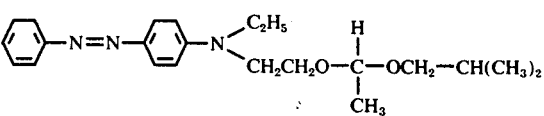

6. An organic solvent-soluble azo dye having the formula
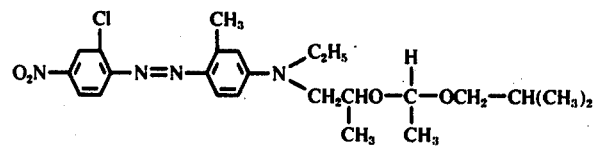
* * * * *

UNITED STATES PATENT AND TRADEMARK OFFICE
CERTIFICATE OF CORRECTION

PATENT NO. : 4,011,209
DATED : Francesco De FEO et al
INVENTOR(S) : March 8, 1977

It is certified that error appears in the above-identified patent and that said Letters Patent are hereby corrected as shown below:

<u>Col. 1,</u> under References Cited, the following citation should appear

| 2,045,323 | 6/1936 | Felix et al. | 260/206 |
| 2,082,156 | 6/1937 | Felix et al. | 260/206 |
| 2,475,228 | 7/1949 | Felix et al. | 260/205 |

<u>Col. 1, line 2,</u> "continuation, division," should be

- - - continuation - - -.

<u>Col. 2, line 26,</u> the formula "$CH_2 = CH - O - R'''$" should appear as follows

- - - $CH_2 = CH - O - R'''$ (III) - - -.

<u>Col. 2, line 30,</u> "$BF_3$; $(C_2H_5)_2O$; $AlCl_3CaCl_2$;" should appear as - - - $BF_3$; $(C_2H_5)_2O$; $AlCl_3$; $CaCl_2$; - - -.

<u>Col. 3, line 12,</u> "execptionally" should be - - - exceptionally - - -.

UNITED STATES PATENT AND TRADEMARK OFFICE
CERTIFICATE OF CORRECTION

PATENT NO. : 4,011,209  
DATED : March 8, 1977  
INVENTOR(S) : Francesdo De FEO et al Page 2 of 2

It is certified that error appears in the above-identified patent and that said Letters Patent are hereby corrected as shown below:

<u>Col. 4, line 56</u>, "temperatur" should be - - - temperature - - -.

<u>Col. 5, line 43</u>, "11 ml HCl $_{10}$ N" should be

- - - 11 ml HCl 10 N - - -.

<u>Claim 1, lines 7 and 8, after the structural formula in Col. 7,</u> should read as follows:

- - - R' represents alkyl containing from 1 to 3 carbon atoms; or R' represents the group

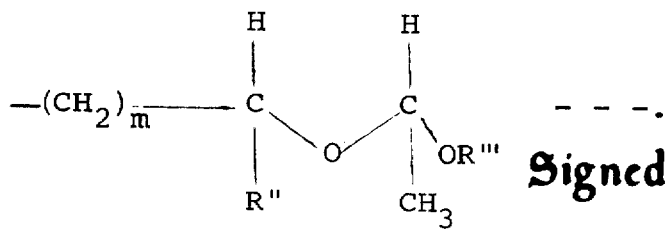

- - -.

Signed and Sealed this

Seventh Day of November 1978

[SEAL]

Attest:

RUTH C. MASON  
*Attesting Officer*

DONALD W. BANNER  
*Commissioner of Patents and Trademarks*

UNITED STATES PATENT AND TRADEMARK OFFICE
CERTIFICATE OF CORRECTION

PATENT NO. : 4,011,209
DATED : March 8, 1977
INVENTOR(S) : Francesco De Feo et al.

It is certified that error appears in the above—identified patent and that said Letters Patent is hereby corrected as shown below:

On the title page the following should be added:

-- [30] Foreign Application Data

June 17, 1970     Italy     2611 A/70

Signed and Sealed this

Sixteenth Day of December 1980

[SEAL]

Attest:

SIDNEY A. DIAMOND

Attesting Officer     Commissioner of Patents and Trademarks

UNITED STATES PATENT AND TRADEMARK OFFICE
CERTIFICATE OF CORRECTION

PATENT NO. : 4,011,209
DATED : March 8, 1977
INVENTOR(S) : Francesco De Feo, et al It is certified that error appears in the above—identified patent and that said Letters Patent is hereby corrected as shown below:

On the title page, the following should be added:

-- [30] Foreign Application Data

June 17, 1970    Italy    26111 A/70 --

THIS CERTIFICATE SUPERSEDES CERTIFICATE OF CORRECTION ISSUED December 16, 1980.

Signed and Sealed this

Third Day of March 1981

[SEAL]

*Attest:*

*Attesting Officer*

RENE D. TEGTMEYER

*Acting Commissioner of Patents and Trademarks*